US010099737B2

(12) United States Patent
Macri et al.

(10) Patent No.: US 10,099,737 B2
(45) Date of Patent: Oct. 16, 2018

(54) METHOD STATION FOR VEHICLE BODY DOOR ASSEMBLY

(71) Applicant: UTICA ENTERPRISES, INC., Troy, MI (US)

(72) Inventors: David A. Macri, Macomb, MI (US); Mark A. Savoy, Warren, MI (US)

(73) Assignee: UTICA ENTREPRISES, INC., Troy, MI (US)

(*) Notice: Subject to any disclaimer, the term of this patent is extended or adjusted under 35 U.S.C. 154(b) by 0 days.

(21) Appl. No.: 15/582,943

(22) Filed: May 1, 2017

(65) Prior Publication Data

US 2017/0361885 A1    Dec. 21, 2017

Related U.S. Application Data

(60) Provisional application No. 62/350,376, filed on Jun. 15, 2016.

(51) Int. Cl.
| | | |
|---|---|---|
| *B62D 65/02* | (2006.01) | |
| *B62D 65/06* | (2006.01) | |
| *B25J 11/00* | (2006.01) | |
| *B25J 13/08* | (2006.01) | |
| *B25J 19/02* | (2006.01) | |

(52) U.S. Cl.
CPC ........... *B62D 65/024* (2013.01); *B25J 11/005* (2013.01); *B25J 13/088* (2013.01); *B25J 19/022* (2013.01); *B25J 19/023* (2013.01); *B62D 65/06* (2013.01)

(58) Field of Classification Search
CPC ...... B62D 65/024; B62D 65/06; B25J 19/023; B25J 19/022; B25J 11/005; B25J 13/088
See application file for complete search history.

(56) References Cited

U.S. PATENT DOCUMENTS

| | | | |
|---|---|---|---|
| 4,961,257 A | 10/1990 | Sakamoto et al. | |
| 2009/0001763 A1 | 1/2009 | Emerich et al. | |
| 2012/0017413 A1 | 1/2012 | Carter et al. | |
| 2014/0165360 A1 | 6/2014 | Mangiarino | |
| 2014/0165386 A1* | 6/2014 | Jin | B23P 19/04 29/700 |
| 2014/0165387 A1* | 6/2014 | Jin | B23P 19/107 29/821 |
| 2015/0082608 A1* | 3/2015 | Lee | B62D 65/06 29/525.01 |

OTHER PUBLICATIONS

PCT International Search Report and Written Opinion dated Jul. 13, 2017, Application No. PCT/US2017/030349, Applicant UTICA Enterprises, Inc., 7 Pages.

* cited by examiner

*Primary Examiner* — Ryan J Walters
(74) *Attorney, Agent, or Firm* — Brooks Kushman P.C.

(57) ABSTRACT

A method and assembly station (12) for assembling vehicle body doors (22) utilizes sensing of vehicle body hinge members (26) and door hinge members (28) with the door positioned by a robot (16) to provide assembly with reduced labor cost.

8 Claims, 6 Drawing Sheets

METHOD STATION FOR VEHICLE BODY DOOR ASSEMBLY

CROSS-REFERENCE TO RELATED APPLICATIONS

This application claims the benefit of U.S. provisional application Ser. No. 62/350,376 filed Jun. 15, 2016, the entire disclosure of which is hereby incorporated by reference.

TECHNICAL FIELD

This invention relates to a method for robotically performing vehicle body door assembly.

BACKGROUND

Vehicle body door assembly conventionally utilizes human workers to provide assembly of vehicle body doors on associated vehicle bodies along an assembly line. The cost of such labor necessarily increases the resultant cost of the vehicle upon completion of its assembly.

SUMMARY

One object of the present invention is to provide an improved method for vehicle body door assembly.

In carrying out the above object, the door assembly method of the invention is performed by initially positioning a vehicle body in an assembly station of a vehicle body assembly line and operating a robot to move a door to an initial mounting position adjacent a door opening of the vehicle body, with the vehicle body and the door each having an associated pair of hinge members each of which includes an associated pivot axis, with each hinge member of one of the pair of hinge members having a shaft defining a hole through which its associated pivot axis extends, and with each hinge member of the other pair of hinge members having a pin through which its associated pivot axis extends. The locations of the pair of door hinge members with respect to the pair of vehicle body hinge members are sensed to determine whether the door hinge members are properly positioned longitudinally along the vehicle X axis, laterally along the vehicle Y axis and vertically along the vehicle Z axis and are also properly angularly oriented for roll i about the X axis, pitch j about the Y axis and yaw k about the Z axis with all of the pivot axes aligned with each other for respective assembly of the pair of door hinge members to the pair of vehicle body hinge members. In response to the sensing, performing any necessary positioning operation of the robot to move the door relative to the vehicle body to properly position the pair of door hinge members with respect to the pair of vehicle body hinge members to align the pivot axes of all of the hinge members with each other for assembly of the door hinge members to the vehicle body hinge members. Then, performing an insertion operation of the robot to move the door along the aligned pivot axes of the hinge members for insertion of the pins into the holes of the shafts to mount the door on the vehicle body for pivotal movement between open and closed positions with respect to the door opening.

As disclosed, the insertion operation of the robot moves the door downwardly to provide the insertion of the pins into the holes of the shafts to mount the door on the vehicle body. In one version of the assembly, the robot initially moves the door to the initial mounting position with the door hinge members including the pins projecting downwardly and with the vehicle body hinge members having the shafts including the holes located below the pins prior to the insertion of the pins into the holes of the shafts, and the insertion operation of the robot moves the door downwardly to insert the pins downwardly into the holes of the shafts. In another version of the assembly, the robot initially moves the door to the initial mounting position with the vehicle body hinge members including the pins projecting upwardly and with the door hinge members having the shafts including the holes located above the pins prior to the insertion of the pins into the holes of the shafts, and the insertion operation of the robot moves the door downwardly to insert the pins from below into the holes of the shafts.

The vehicle body door assembly method is disclosed as being performed with: (a) the vehicle body hinge members mounted on the exterior of the vehicle body and the door hinge members mounted on the exterior of the door; (b) the vehicle body hinge members mounted on the interior of the vehicle body and the door hinge members are mounted on the interior of the door; (c) the vehicle body hinge members mounted on the interior of the vehicle body and the door hinge members mounted on the exterior of the door; or (d) the vehicle body hinge members mounted on the exterior of the vehicle body and the door hinge members mounted on the interior of the door.

The vehicle body door assembly method is also disclosed as being performed before painting of the vehicle body and the door or after painting of the vehicle body and the door.

The vehicle body door assembly method is further disclosed by assembling doors at the same time on both driver and passenger sides of the vehicle body, by assembling doors at both front and rear door openings of the vehicle body, by assembling doors at the same time at the front and rear door openings of the vehicle body, and by assembling doors sequentially at the front and rear door openings of the vehicle body. One or more robot end effectors are disclosed so each selectively positions one of a plurality of differently constructed doors for the assembly.

Different combinations of the above disclosed modes of door assembly can be performed as needed.

The objects, features and advantages of the present invention are readily apparent from the following detailed description of the disclosed embodiment when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The method for vehicle body door assembly and the vehicle body assembly station for use in a vehicle assembly line are illustrated by the drawings and will be described in an integrated manner to facilitate an understanding of the invention.

Figure 1:
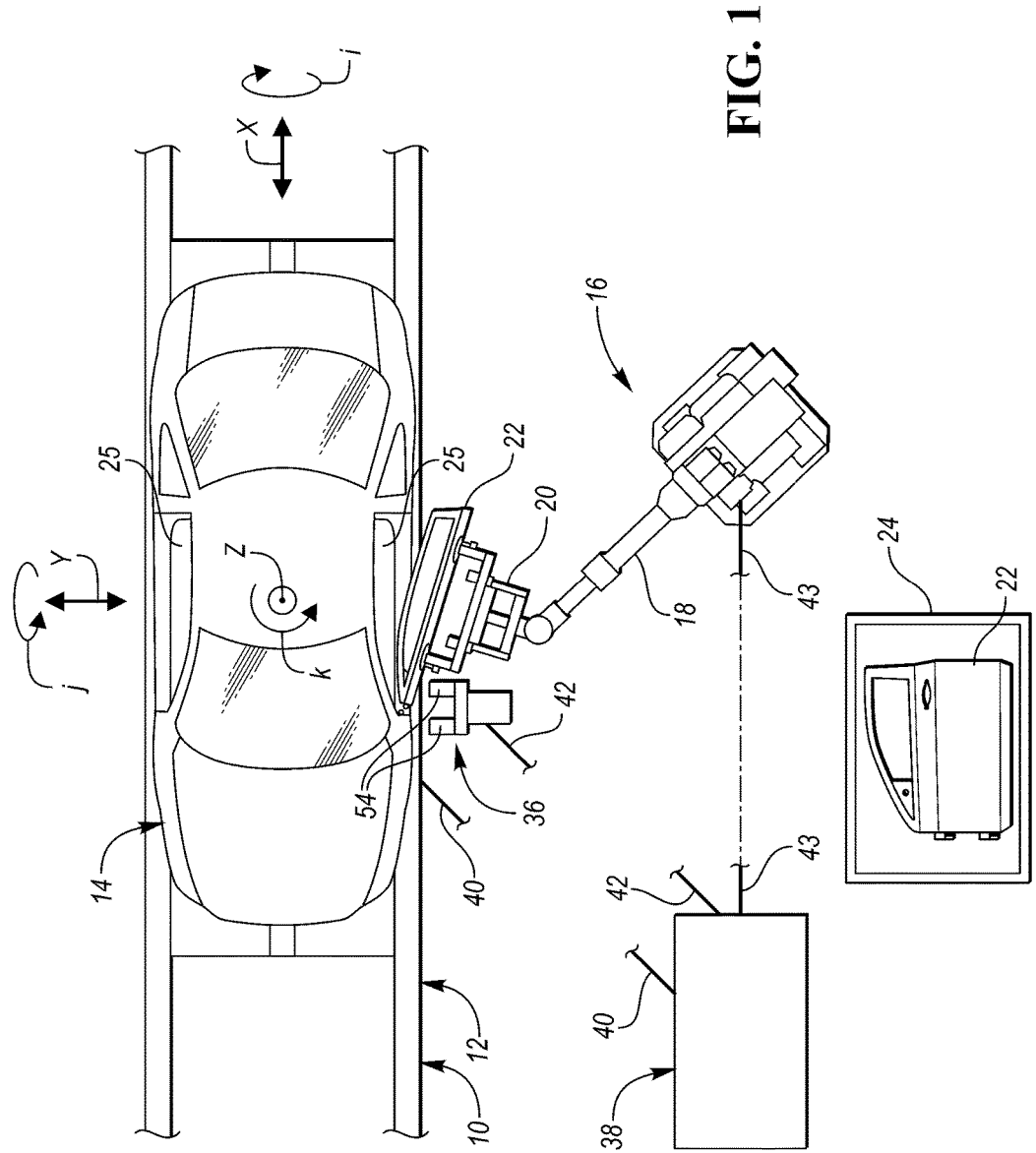
FIG. 1 is a top plan view of a vehicle body assembly station constructed to provide the vehicle body door assembly method of the invention.

With reference to FIG. 1, a vehicle body assembly line 10 is illustrated as having the assembly station 12 to which a vehicle body 14 is moved by any conventional type of conveyance along the X direction toward the left which is longitudinally relative to the vehicle body. A robot 16 is configured to provide the door assembly and has an arm 18 supporting an end effector 20 for sequentially moving vehicle doors 22 from a supply bin 24 to an initial mounting position as shown adjacent the door opening 25 which is the driver side door opening as illustrated.

Figure 2A:
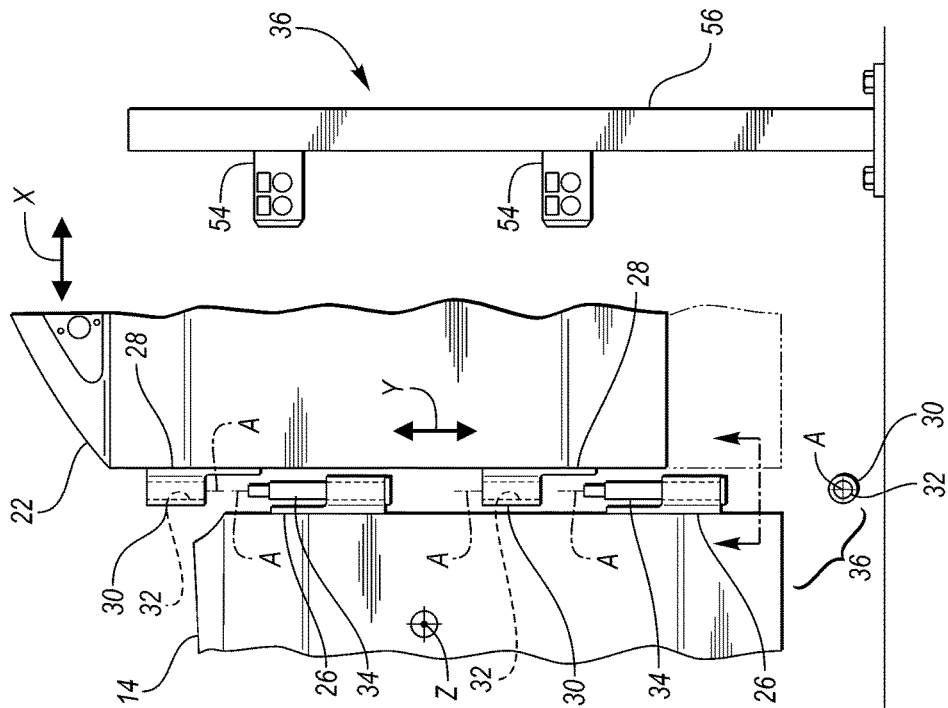
FIG. 2A is a side elevational view illustrating one manner in which a vehicle body door is robotically assembled by moving door hinge member pins downwardly into shaft holes of vehicle body hinge members.
Figure 2B:
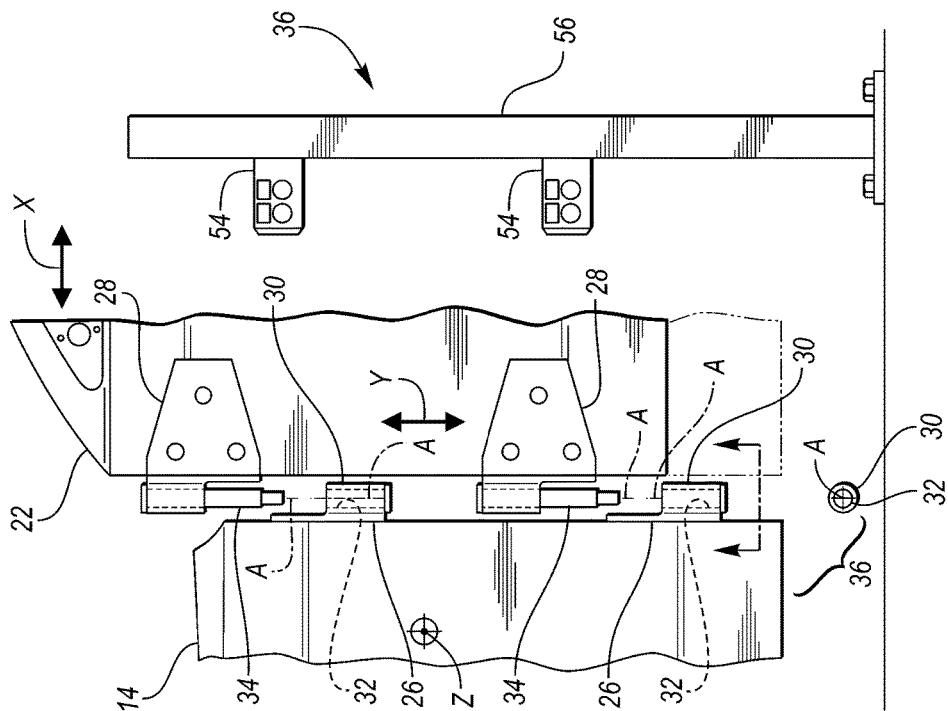
FIG. 2B is another side elevational view illustrating another embodiment wherein vehicle door hinge members are moved downwardly with shaft holes thereof receiving vehicle body hinge member pins to provide the door assembly.

As illustrated in both FIGS. 2A and 2B, the vehicle body 14 and the door 22 each have an associated pair of hinge members with the vehicle body hinge members identified by 26 and the door hinge members identified by 28. The vehicle body and door hinge members 26 and 28 are respectively located at upper and lower locations on the vehicle body and the door to provide mounting of the door after the assembly. Each of the hinge members 26 or 28 of one pair of hinge members has a shaft 30 defining a hole 32 of a round shape having a central pivot axis A while the other hinge member 26 or 28 of each pair of hinge members has a pin 34 of a round cross section whose center has a pivot axis A.

In the initial door position to which the robot 16 moves the door 22 as shown in both FIGS. 2A and 2B, a sensor assembly 36 senses the locations of the pair of door hinge members 28 with respect to the pair of vehicle body hinge members 26 to determine whether the door hinge members are properly positioned longitudinally along the vehicle X axis, laterally along the vehicle Y axis and vertically along the vehicle Z axis and are also properly angularly oriented for roll i about the X axis, pitch j about the Y axis and yaw k about the Z axis and with all of the pivot axes A aligned with each other for respective assembly of the pair of door hinge members 28 to the pair of vehicle body hinge members 26. In response to the sensing, any necessary further operation of the robot is provided to move the door relative to the vehicle body to properly position the pair of door hinge members 28 with respect to the pair of vehicle body hinge members 26 so the pivot axes A of all of the hinge members are aligned with each other for proper assembly of the door hinge members to the vehicle body hinge members. Then, further operation of the robot is provided to move the door along the aligned pivot axes A of the hinge members for insertion of the pins 34 shown in both FIG. 2A and FIG. 2B into the holes 32 of the shafts 30 to mount the door on the vehicle body for pivotal movement between open and closed positions with respect to the door opening.

As shown in FIG. 1, the assembly station 12 includes a controller 38 that is configured to operate the robot 16 in cooperation with the sensing assembly 36 to provide the vehicle body door assembly as described above. More specifically, the controller 38 has suitable connection 40 to the assembly station 12 to sense the vehicle body readiness for the door assembly, has connection 42 to the sensing assembly 36 to sense the vehicle body and hinge member positioning as described above, and has connection 43 to the robot 16 to provide the robot operation.

In both the embodiments in FIGS. 2A and 2B, the robot moves the door 22 downwardly to provide insertion of the pins 34 into the shaft holes 32. In the embodiment of FIG. 2A, the door hinge members 28 have the pins 34 which project downwardly and the vehicle body hinge members 26 have the shafts 30 including the holes 32 which are located below the pins prior to insertion of the pins into the holes of the shafts, such that the final further operation of the robot moves the door downwardly to insert the pins downwardly into the holes of the shafts. In the embodiment of FIG. 2B, the vehicle body hinge members 26 include the pins 38 which project upwardly and the door hinge members 28 have the shafts 30 including the holes 32 which are located above the pins prior to insertion of the pins into the holes of the shafts, such that the final further operation of the robot moves the door downwardly to insert the pins from below into the holes of the shafts.

Figure 3:
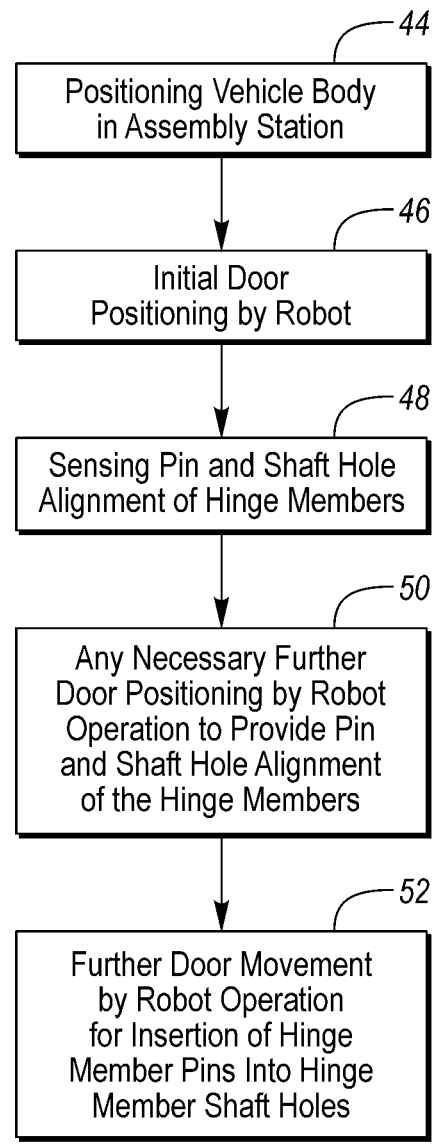
FIG. 3 is a flow chart that illustrates the robotic assembly operation of the door to the vehicle body.

FIG. 3 is a flow chart illustrating the vehicle body door assembly. More specifically, the initial positioning of the vehicle body in the assembly station is illustrated as step 44 and is followed by the initial door positioning by the robot as identified by step 46. Thereafter, the sensing of the pin and shaft hole alignment of the hinge members on the initially positioned door is identified by step 48 and is followed by any necessary further door positioning by robot operation to provide pin and shaft hole alignment of the hinge members as shown by step 50 which precedes the final step 52 of further door movement by robot operation for insertion of the hinge member pins into the hinge member shaft holes.

Figure 4A:
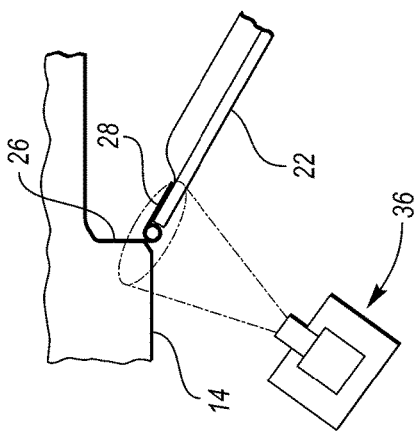
FIG. 4A is a schematic top plan view illustrating one practice of the invention in which the door assembly is performed with the vehicle body hinge members mounted externally of the vehicle body and with the door hinge members mounted externally of the vehicle door.
Figure 4B:
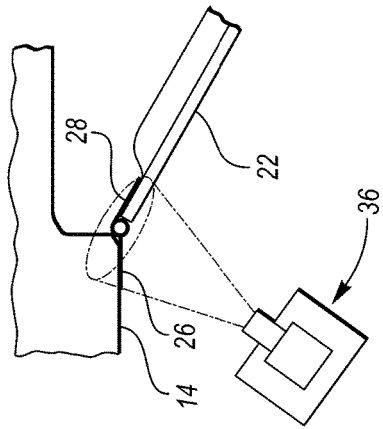
FIG. 4B is a schematic top plan view illustrating another practice of the invention in which the door assembly is performed with the vehicle body hinge members mounted internally of the vehicle body and with the door hinge members mounted internally of the vehicle door.
Figure 4C:
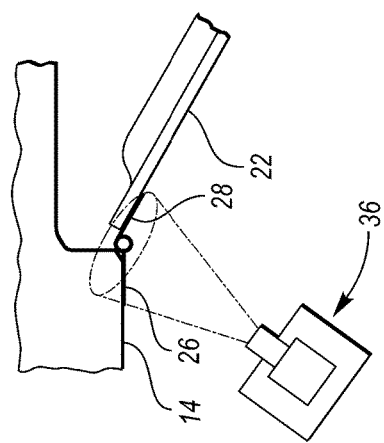
FIG. 4C is a schematic top plan view illustrating a further practice of the invention in which the door assembly is performed with the vehicle body hinge members mounted internally of the vehicle body and with the door hinge members mounted externally of the vehicle door.
Figure 4D:
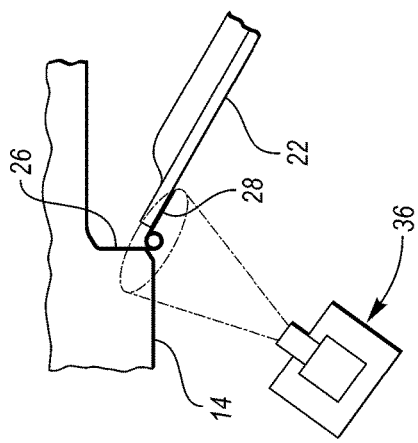
FIG. 4D is a schematic top plan view illustrating a still further practice of the invention in which the door assembly is performed with the vehicle body hinge members mounted externally of the vehicle body and with the door hinge members mounted internally of the vehicle door.

With reference to FIGS. 4A, 4B, 4C and 4D, the vehicle body hinge members 26 can have the vehicle door hinge members 28 mounted thereon in different ways while carrying out the invention. More specifically, as shown in FIG. 4A, the vehicle body hinge members 26 are mounted on the exterior of the vehicle body 14 and the vehicle door hinge members 28 are mounted on the exterior of the vehicle door 22. In the embodiment of FIG. 4B, the vehicle body hinge members 26 are mounted on the interior of the vehicle body 14 and the vehicle door hinge members 28 are mounted on the interior of the vehicle door 22. Furthermore, as illustrated in FIG. 4C, the vehicle body hinge members 26 are mounted on the interior of the vehicle body 14 and the vehicle door hinge members 28 are mounted on the exterior of the vehicle door 22. Lastly, as illustrated in FIG. 4D, the vehicle body hinge members 26 are illustrated as mounted on the exterior of the vehicle body 14 and the vehicle door hinge members 28 are mounted on the interior of the vehicle door 22. In each of these modes of assembly, the terms "interior" and "exterior" are with respect to the outer surfaces of the vehicle body and the door and describe the location of almost the entire extent of each of the mounted hinge members.

In all of the embodiments of the invention, the vehicle body door assembly can be performed before painting of the vehicle body 14 and each of its doors 22 and can also be performed after the painting of the vehicle body 14 and each of its doors.

Figure 5:
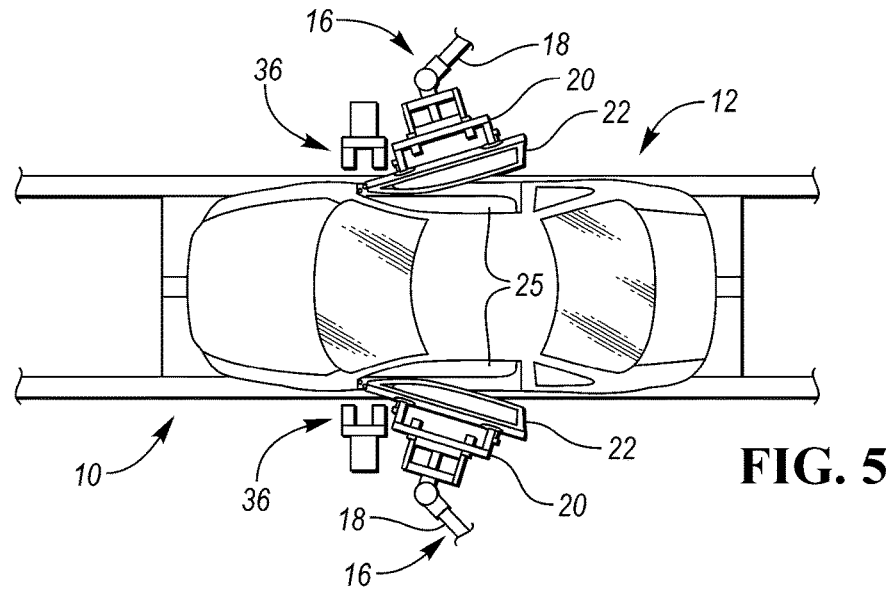
FIG. 5 is a top plan view illustrating an embodiment of the assembly station having both driver and passenger doors respectively assembled to driver and passenger sides of the vehicle body.

With reference to FIG. 5, almost all vehicle bodies have both driver and passenger doors and it is thus desirable to have a pair of robots 16 and associated sensor assemblies 36 for simultaneous assembling of driver and passenger doors 22 in the same way previously described.

Figure 6:
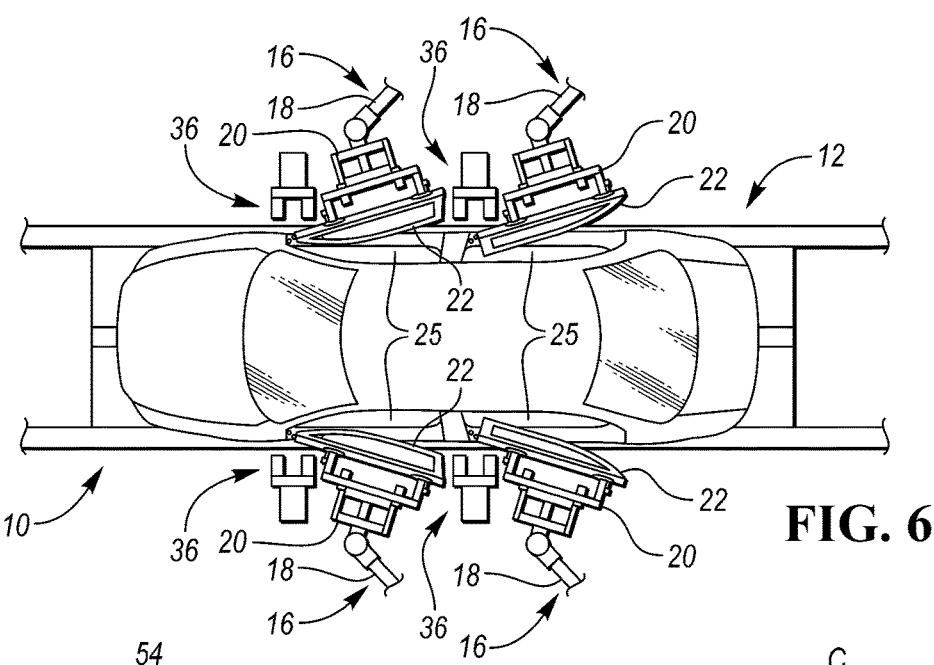
FIG. 6 is a view that illustrates a still further embodiment of the assembly station wherein four robots are utilized to simultaneously assemble both front and rear doors at both driver and passenger sides of the vehicle body.

Furthermore, most vehicle bodies have both front and rear doors on both the driver and passenger sides such that four robots 16 and associated sensing assemblies 36 as shown in FIG. 6 allows simultaneous mounting of front and rear doors on both driver and passenger sides. However, it is possible to utilize the embodiment of FIG. 5 where the front and rear doors are sequentially assembled with the use of only two robots 16 although such assembly will require additional cycle time.

Figure 7A:
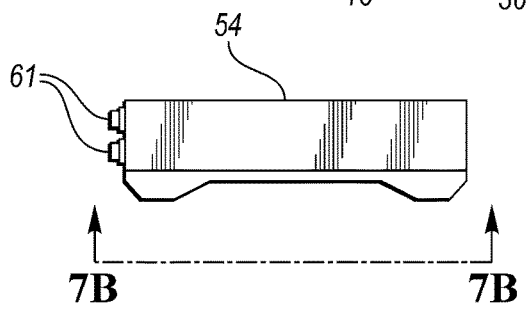
FIG. 7A is a top plan view of a sensor of a sensor assembly of the assembly station.
Figure 7B:
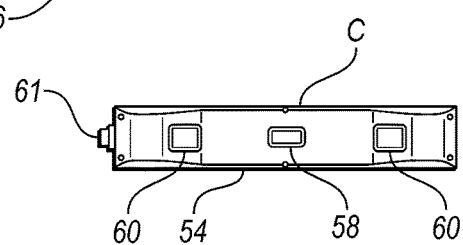
FIG. 7B is a front view of the sensor taken along the direction of line 7b-7d in FIG. 7A to illustrate that the sensor includes a laser projector window and a pair of camera windows between which the laser projector window is located.
Figure 8:
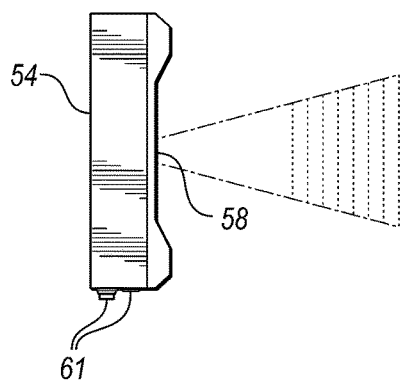
FIGS. 8 and 9 are top plan and elevational views of the sensor and respectively illustrate the horizontal and vertical range of laser projection from the laser projection window during operation of the sensor assembly.
Figure 10:
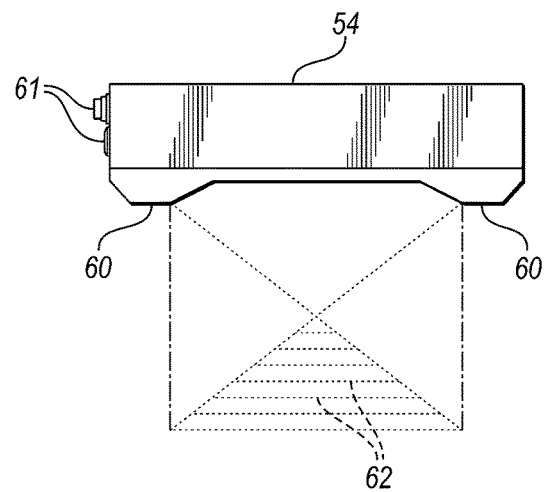
FIG. 10 is a top plan view of the sensor that illustrates the range of camera window sensing of the reflection of the laser from the hinge members to determine their axes for alignment.
Figure 9:
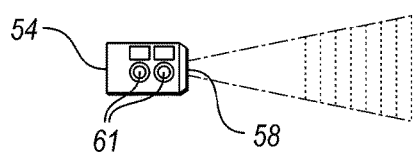

With references to FIGS. 2A and 2B, each of the sensing assemblies 36 has both upper and lower sensors 54 for respectively sensing the positions of the vehicle body hinge members 26 and door hinge members 28 and their orientations as previously described. These sensors 54 are mounted on a vertical floor stand 56 and their constructions are further shown in FIGS. 7A, 7B and 8-10. More specifically, FIGS. 7A and 7B are top plan and front elevational views illustrating the sensors 54 which each include, a central laser projection window 58 located between a pair of spaced camera windows 60 and connectors 61 to communicate with the controller 38 shown in FIG. 1. The laser projection window 58 shown in FIG. 7B projects the laser in the horizontal range shown in FIG. 8 and the vertical range shown in FIG. 9. Camera windows 60 shown in FIG. 7B have an overlapping field of view shown by dash lines 62 in FIG. 10 for receiving the reflected laser beams from the hinge members to sense their locations within near and far limits that are sufficient to accommodate for tolerance variations of the vehicle body and door positioning during manufacturing.

Figure 11:
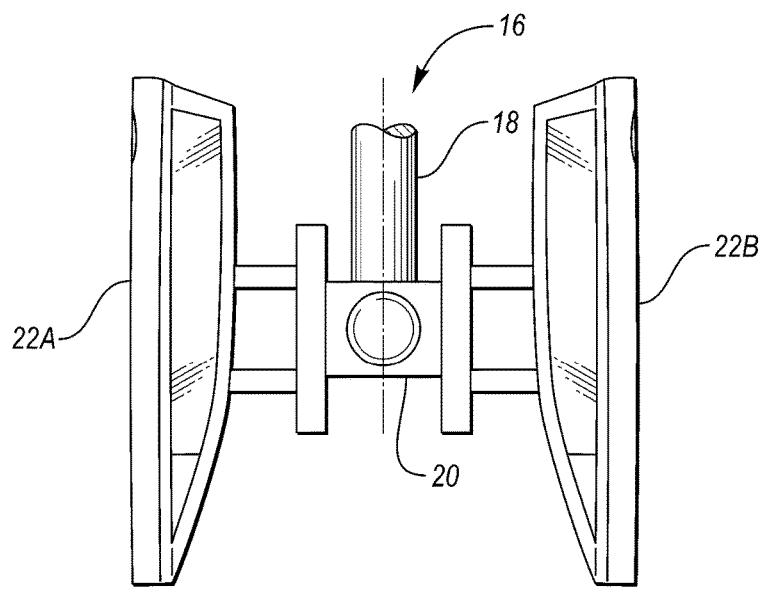
FIG. 11 is a partial top plan view of a robot and its end effector that provides assembly of differently constructed doors.

As shown in FIG. 11, the robot 16 can have an end effector 20 that mounts a plurality of different constructed doors so the assembly line can assemble different models of vehicle bodies during the same production shift. As shown, a pair of the different doors 22a and 22b are received by the end effector 22 which pivots to selectively provide processing of either door for assembly to the vehicle body.

Upon performing the sensing, the sensors 54 scan the hinge members 26 and 28 along their adjacent shafts 30 and pins 34 at multiple locations to determine the X, Y, Z locations and the i, j, p orientations in order to determine the alignment status of the axes A as used in the door mounting as described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for vehicle body door assembly comprising:
   positioning a vehicle body in an assembly station of a vehicle body assembly line;
   operating a robot to move a door to an initial mounting position adjacent a door opening of the vehicle body, with the vehicle body and the door each having an associated pair of hinge members each of which includes an associated pivot axis, with each hinge member of one of the pair of hinge members having a shaft defining a hole through which its associated pivot axis extends, and with each hinge member of the other pair of hinge members having a pin through which its associated pivot axis extends;
   sensing the locations of the pair of door hinge members with respect to the pair of vehicle body hinge members to determine whether the door hinge members are properly positioned longitudinally along the vehicle X axis, laterally along the vehicle Y axis and vertically along the vehicle Z axis and are also properly angularly oriented for roll i about the X axis, pitch j about the Y axis and yaw k about the Z axis with all of the pivot axes aligned with each other for respective assembly of the pair of door hinge members to the pair of vehicle body hinge members;
   then in response to the sensing, performing any necessary positioning operation of the robot to move the door relative to the vehicle body to properly position the pair of door hinge members with respect to the pair of vehicle body hinge members to align the pivot axes of all of the hinge members with each other for assembly of the door hinge members to the vehicle body hinge members; and
   then performing an insertion operation of the robot to move the door along the aligned pivot axes of the hinge members for insertion of the pins into the holes of the shafts to mount the door on the vehicle body for pivotal movement between open and closed positions with respect to the door opening.

2. A method for vehicle body door assembly as in claim 1 wherein the insertion operation of the robot moves the door downwardly to provide the insertion of the pins into the holes of the shafts to mount the door on the vehicle body.

3. A method for vehicle body door assembly as is claim 1 wherein when the robot initially moves the door to the initial mounting position, the door hinge members include the pins which project downwardly and the vehicle body hinge members have the shafts including the holes which are located below the pins prior to the insertion of the pins into the holes of the shafts, and the insertion operation of the robot moves the door downwardly to insert the pins downwardly into the holes of the shafts.

4. A method for vehicle body door assembly as is claim 1 wherein when the robot initially moves the door to the initial mounting position, the vehicle body hinge members include the pins which project upwardly and the door hinge members have the shafts including the holes which are located above the pins prior to the insertion of the pins into the holes of the shafts, and the insertion operation of the robot moves the door downwardly to insert the pins from below into the holes of the shafts.

5. A method for vehicle body door assembly as in claim 1 wherein: (a) the vehicle body hinge members are mounted on the exterior of the vehicle body and the door hinge members are mounted on the exterior of the door; (b) the vehicle body hinge members are mounted on the interior of the vehicle body and the door hinge members are mounted on the interior of the door; (c) the vehicle body hinge members are mounted on the interior of the vehicle body and the door hinge members are mounted on the exterior of the door; or (d) the vehicle body hinge members are mounted on the exterior of the vehicle body and the door hinge members are mounted on the interior of the door.

6. A method for vehicle body door assembly as in claim 5 wherein the vehicle body door assembly is performed before or after painting of the vehicle body and the door.

7. A method for vehicle body door assembly as in claim 6 wherein front and rear doors are assembled at the same time on both driver and passenger sides of the vehicle body and/or front and rear doors are assembled at either the same time or sequentially at both front and rear door openings of the vehicle body.

8. A method for vehicle body door assembly as in claim 7 wherein one or more robot end effectors each selectively positions one of a plurality of differently constructed doors for the assembly.

* * * * *

UNITED STATES PATENT AND TRADEMARK OFFICE
CERTIFICATE OF CORRECTION

PATENT NO. : 10,099,737 B2
APPLICATION NO. : 15/582943
DATED : October 16, 2018
INVENTOR(S) : David A. Macri et al.

Page 1 of 1

It is certified that error appears in the above-identified patent and that said Letters Patent is hereby corrected as shown below:

In the Claims

Column 7, Line 8, Claim 3:
After "vehicle body door assembly as"
Delete "is" and
Insert -- in --.

Column 7, Line 17, Claim 4:
After "vehicle body door assembly as"
Delete "is" and
Insert -- in --.

Signed and Sealed this
Sixteenth Day of April, 2019

Andrei Iancu
*Director of the United States Patent and Trademark Office*